April 17, 1956 R. R. LAW 2,742,522

COLOR TELEVISION

Filed May 17, 1950 3 Sheets-Sheet 1

INVENTOR
Russell R. Law
BY
ATTORNEY

April 17, 1956 R. R. LAW 2,742,522

COLOR TELEVISION

Filed May 17, 1950 3 Sheets-Sheet 2

INVENTOR
Russell R. Law
BY Glenn F. Mitchell
ATTORNEY

April 17, 1956 R. R. LAW 2,742,522

COLOR TELEVISION

Filed May 17, 1950 3 Sheets-Sheet 3

INVENTOR
Russell R. Law
BY
Olin J. Mitchell
ATTORNEY

′United States Patent Office 2,742,522

Patented Apr. 17, 1956

2,742,522

COLOR TELEVISION

Russell Robin Law, Princeton, N. J., assignor to Radio Corporation of America, a corporation of Delaware Application May 17, 1950, Serial No. 162,517

6 Claims. (Cl. 178—5.4)

This invention relates to apparatus for improving the color balance in color television receivers.

Generally speaking, color television systems operate, by transmission of information as to the intensity of three different component colors. In most cases, the colors selected are red, green and blue. At the receiver these colors may be reproduced by cathode ray tubes employing phosphors which emit light of the same component colors when struck by a moving stream of electrons.

However, due to variations in thickness and light emission efficiency, it often happens that the amount of light emitted by one phosphor for a given stimulus or amplitude of a video signal is different from the amount of light emitted by another in response to the same stimulus. Thus, the ratio between the lights emitted by the separate phosphors is not the same as the ratios between the video signals representing the component colors of the image to be televised. This disturbs the color balance in the image reproduced at the receiver so that the colors observed are not correct.

It is, therefore, the object of this invention to provide an improved means for balancing the amount of light emitted by the different phosphors in an apparatus for reproducing colored images.

Another purpose of the invention is to effect color balance in apparatus for reproducing colored images from transmitted signals in such a way as to prevent amplitude modulation from being introduced.

There are basically two ways for transmitting the information as to the intensity of the different component colors. In accordance with one known method, the transmitted signal sequentially represents the intensities of the different component colors. In accordance with a second method, the transmitted signal or signals continuously represents the intensities of each of the component colors. This invention relates to receivers that are adapted to cooperate with signals that are of the sequential type. In such a receiver, the transmitted signal is detected and applied to the distributor or sampler. The distributor applies all of the signals that are representative of one component color, for example, red to a means for emitting red light. The other colors are distributed to means for reproducing their particular colors. The distributor can thus be said to sample the received wave and apply all red samples to one image reproducing device, all green samples to another, etc. In some cases, for example, a single beam of electrons is projected towards a directional screen having different color emitting phosphors mounted thereon. The color emitted depends upon the direction of approach of the beam to this screen. The direction of approach is varied as the sequential color information is received so that the red phosphor is struck when the transmitted signal corresponds to the intensity of the red light in the image to be televised, etc. Such an apparatus is described in an application made by Russell R. Law on June 1, 1950 and bearing a Serial No. 165,552.

In other receivers three separate cathode-ray beams are employed. Each of these beams is directed towards a phosphor which emits a particular component color. It is then only necessary to modulate each of the beams with a corresponding video information in order to produce a fully colored image.

In accordance with this invention, color balance is achieved by varying the time during which the beam or beams of electrons strike the different phosphors. For example, if the light emitted by the red phosphor is less than that emitted by the green phosphor, the electrons are permitted to strike the red phosphor for longer periods of time than they are permitted to strike the green phosphor. One important feature of this invention is that no amplitude modulation is effectively introduced into the reproduced image.

Other advantages of this invention will become apparent from a detailed consideration of the drawings in which.

The invention is to be described in connection with a dot multiplex system wherein the transmitted color information is time division multiplexed rapidly with respect to the line scanning rate. A description of such a system may be found in a publication entitled, "Synchronization For Color Dot Interlace in The RCA Color Television System," published by Radio Corporation of America and distributed as of October 1949.

Figures 1, 1A, 1B:
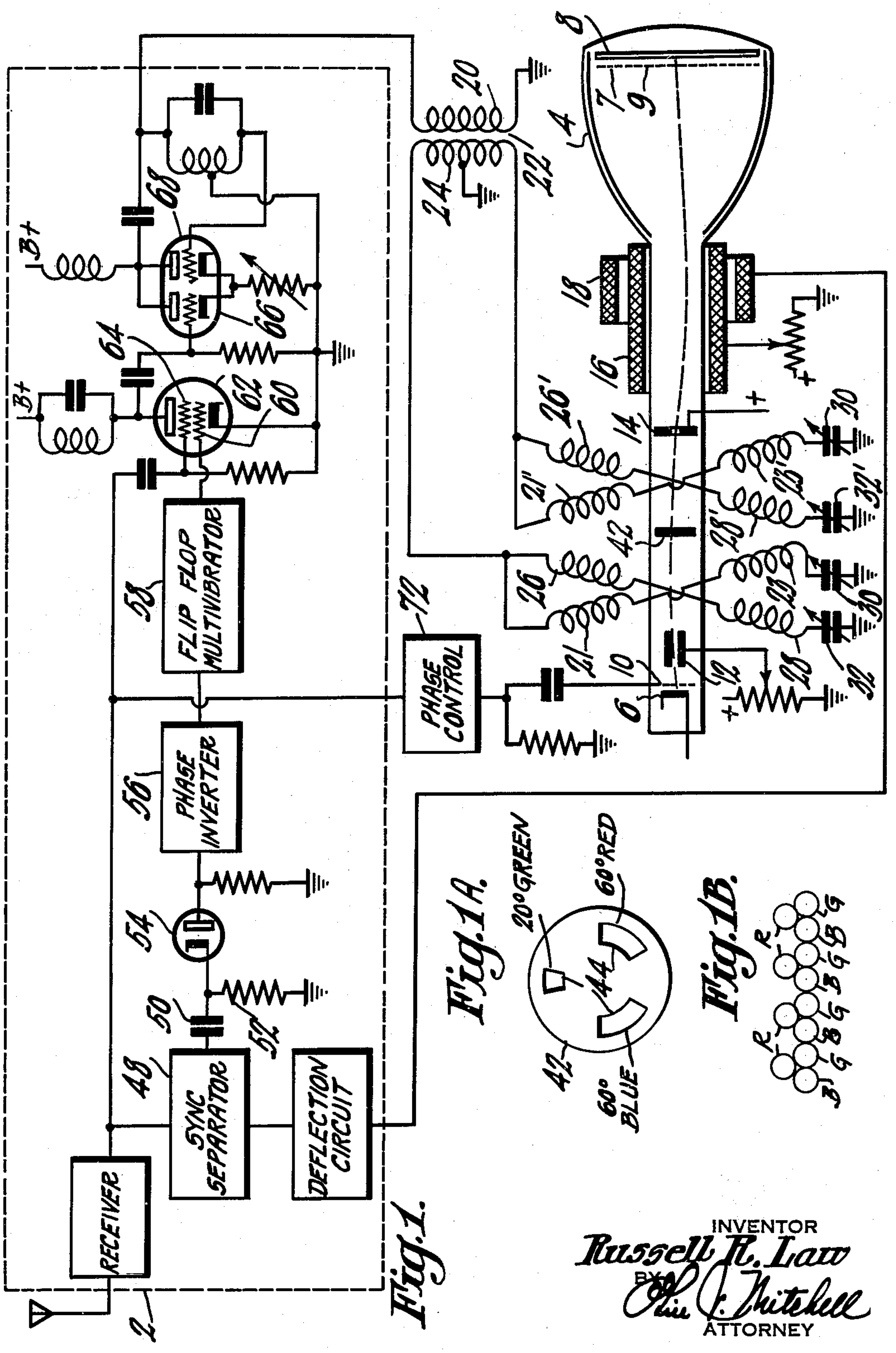
Figure 1 illustrates an arrangement whereby the invention is applied to a colored image reproducing system employing a cathode ray tube having a single beam.
Figure 1A illustrates the plan view of a diaphragm that may be employed to interrupt the beam of electrons in a cathode ray tube that reproduces colored images with a single beam of electrons.
Figure 1B illustrates the arrangement of the different kinds of phosphors on a screen that can be used with either a single beam or a three-beam colored image reproducing cathode ray tube.

The part of the schematic arrangement shown inside of the dotted box 2 of Figure 1 is directed towards deriving the video signals from the transmitted information and to synchronizing the dot multiplexing at the receiver with the dot multiplexing at the transmitter and will be described in detail below.

A special type of direct view single beam color reproducing tube that may be employed in the system is illustrated in detail in Figure 1. It includes an evacuated glass envelope 4 having mounted therein an electron gun structure 6. The electron gun is adapted to project a stream of electrons toward a multi-color element phosphor screen 8. In the arrangement shown the spots of phosphor that emit different colored lights when struck by beams of electrons, are arranged as shown in Figure 1B. The spots that reproduce red light are indicated by the letter R, green light by the letter G, and blue light by the letter B. An aperture 7 in a mask 9 is oriented opposite the geometric center of each of the groups of phosphors. The screen 8 is connected to a relatively high positive voltage so that it serves the dual function of collecting the electrons and accelerating them. The intensity of the beam, and thus the intensity of the color reproduced by the colored phosphors mounted on the screen 8, is controlled by a grid 10.

An electrostatic focusing cylinder 12 of standard design serves to focus the beam of electrons emanating from the gun 6 at the defining aperture 14, and the focusing coil 16 serves to focus the stream of electrons emanating from the defining aperture 14 at the inner surface of the multi-element screen 8 on which the phosphors are mounted. Deflection voltages are applied to the deflection coils 18 so as to cause the beam to scan the screen 8 in a manner well known to those skilled in the art.

However, in contradistinction to other types of tubes in which the beam is bent after or while being deflected, means are provided for bending the beam in the tube before it is deflected. This change in location of the bending is an improvement in at least one respect, namely, that it much simpler to accomplish. Therefore, in between the focusing plates 12 and the defining aperture 14, the beam is first bent outwardly in an axial plane, and then inwardly by successive rotating magnetic fields that are always 180° out of phase with each other. In this way, the direction of approach of the beam to the screen 8 is continuously changed, although the angle of approach is substantially constant.

The speed of rotation of these fields, and thus the speed of rotation of the axial plane in which the beam is bent and the consequent change in direction of approach of the beam to the screen is determined by the frequency of the voltage wave applied to the primary 20 of a transformer 22. A first rotating field is established by connecting two pairs of series connected coils 21, 23, 26 and 28 in parallel between one end of the secondary 24 of the transformer 22 and a center tap. Coils 21 and 23 are connected in series with a variable condenser 30 and coils 26 and 28 are connected in series with a variable condenser 32. The condensers 30 and 32 are adjusted so that each pair of field coils forms a parallel resonant circuit with its half of secondary 24 that is sustantially tuned to the frequency of the voltage present in primary 20. The condenser 30 is adjusted so that its parallel resonant circuit is tuned 45° to one side of resonance and the condenser 32 is adjusted so that its parallel resonant circuit is tuned 45° to the other side of resonance so that the magnetic fields are 90° apart. The coils of each pair are mounted on opposite sides of the central axis of the tube and on the outside of the envelope 4, the axis of one pair being at 90° with the other. In this way, a uniformly rotating field is established at one point in the electron stream. Similar components indicated by primed numerals produce the second rotating field. Because the voltage supplied these components is supplied by the opposite end of the secondary 24, the second rotating field is 180° out of phase.

Under the influence of the first field, the electron stream is bent outwardly from the central axis of the tube and under the influence of the second magnetic field, the electron stream is bent back toward the central axis. In this way, the electron beam approaches the defining aperture 14 at a constant angle, but it rotates about the central axis of the tube. Upon passing beyond the defining aperture, the beam rotates about the normal path that would be followed by an unbent stream of electrons as it is scanned back and forth over the screen 8. However, the current flowing in the focus coil 16 is so adjusted that the beam is focused at the apertured mask 9, therefore striking the mask 9 at the same point as a beam that isn't bent. Therefore, neglecting the scanning produced by the deflection coils 18, the beam may be said to rotate so as to form a cone the apex of which is at the apertures 7 in the mask 9.

In any sequential system it is necessary to reproduce a given color only when the signals corresponding to that color are available. Therefore, beam interrupting means are provided that block the beam when it approaches the screen at such an angle that it can strike more than one phosphor. This can be accomplished by circuits arranged to key the beam on at appropriate intervals, or it may be accomplished by the insertion of a diaphragm 42 in the path of the beam, such as shown in Figure 1A. The diaphragm 42 is mounted in a plane transverse to the beam at a point where the beam is bent away from the axis of the tube. The openings 44 in the diaphragm 42 may, of course, assume any one of numerable configurations. This diaphragm is oriented so that the radii passing through the central points of the openings 44 are substantially parallel to the radii passing through the centers of the spots of phosphors from the geometric center of the groups of phosphors on Figure 1B.

It will be noted that the circumferential lengths of the openings 44 in the diaphragm 42 are different. Assuming that the speed or rotation of the electron beam about the principal axis of the tube is constant, this means that the time that the beam passes through each of the openings will be varied. If, for example, the amount of light emitted by the blue phosphor is greater than the amount emitted by the red and green phosphor, the blue light may be reduced to proper proportions by reducing the angle between the ends of the appropriate aperture in the diaphragm so that the circumferential length is reduced, as shown.

It will be noted that when a directional screen of the type described above is employed, there is only one direction of beam approach at which the beam falls on a particular phosphor. As the electron beam rotates about, it passes through the aperture 7 and the mask 9 at different angles. Inasmuch as the rotation is synchronized with the rate of rotation of the color information, the beam will strike the phosphor in each group that corresponds to the video modulation appearing on the grid 10.

The overall operation of the receiving system shown in Figure 1 will now be explained in conjunction with the details enclosed in the dotted rectangle 2. Assume, by way of example, that the wave received and detected by the standard receiver 46 is comprised of repeated red, blue and green video signals that are time division multiplexed at a frequency of 3.8 megacycles for each color. As the scanning proceeds, the phase of these multiplexed signals with respect to a given point in the scanning cycle may be changed.

The phase and frequency of the multiplexing operation at the receiver can be synchronized with that at the transmitter by transmitting a burst of 3.8 mc. energy of the proper phase on the "back porch" of the horizontal blanking pulse. Briefly, this burst can be separated from the signals detected by the receiver 46 in the following manner. The horizontal sync pulses supplied by a standard sync separator 48 are differentiated by condenser 50 and resistor 52. The negative pip thus produced is selected by the diode 54 and inverted in phase inverter 56. The positive pip thus derived keys a flip-flop multivibrator 58 that is adjusted to provide a positive pulse of a duration equal to the "back porch" interval. The application of this rectangular pulse to the grid 60 of a gating tube 62 permits this burst of 3.8 mc. energy that is present at the output of receiver 46 and applied to grid 64 of the gating tube 62 to be applied to the grid of an amplifier 66. The amplifier 66 is cathode coupled to a 3.8 mc. oscillator 68. In this way, the continuously running oscillator 68 is pulled into step with the burst of 3.8 mc. energy, and its output is applied to primary 20 of the transformer 22.

The rotating fields discussed above operate at a frequency of 3.8 mc., and the plane of the beam of electrons is rotated at the same frequency. Inasmuch as the three colors are reproduced in a single rotation of the beam, the video information supplied to the grid 10 via lead 70 is reproduced into the proper colors at the proper intervals. The selection of the proper color phosphor for a particular interval may be accomplished by rotating the tube 4 within the yokes or by proper adjustment of a phase rotation means 72 that may be of any standard design.

Figure 2:
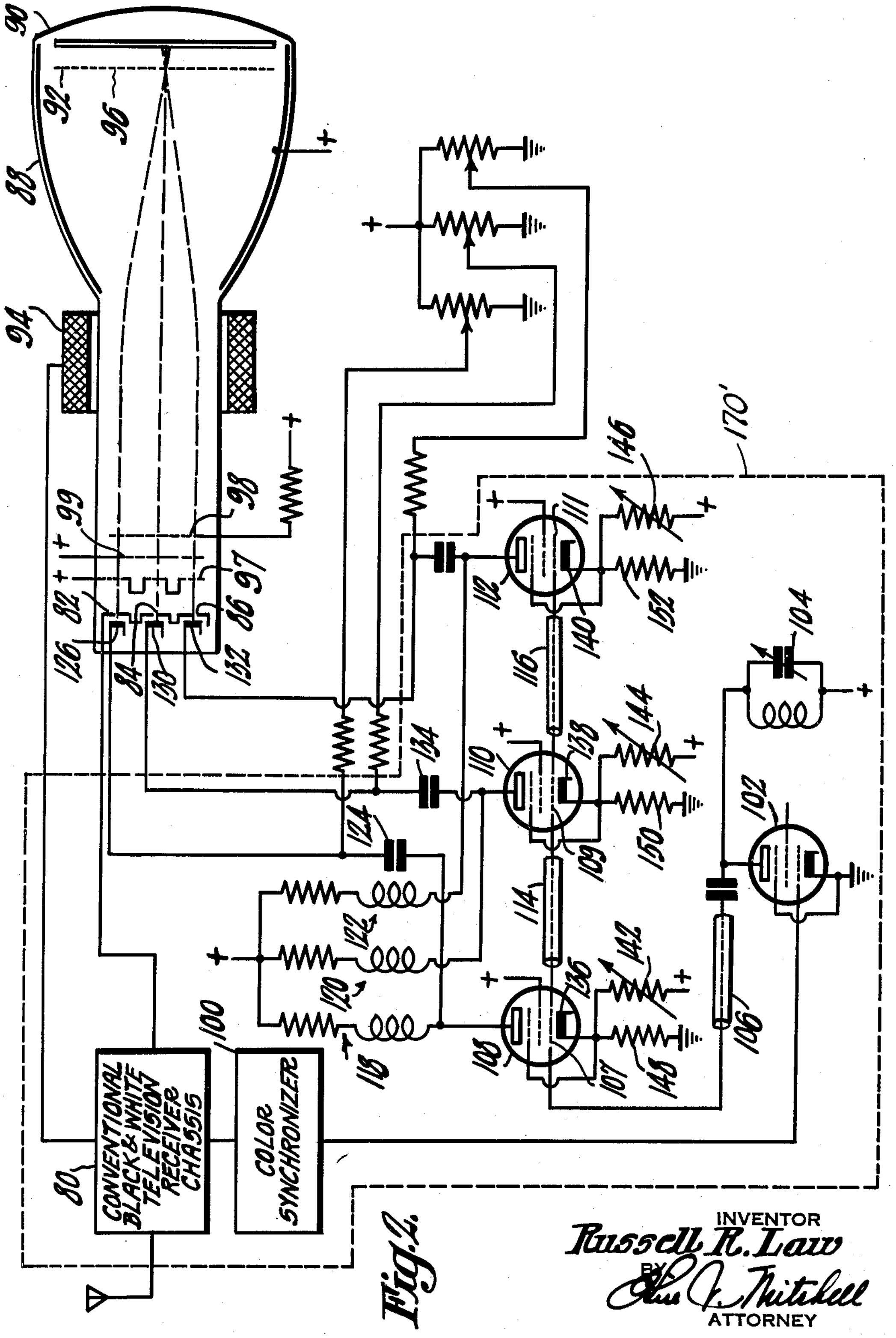
Figure 2 illustrates the application of the principles of this invention to a colored image reproducing system employing a cathode ray tube having three separate cathode ray beams.

The application of this invention to colored image reproducing images employing three cathode ray beams will now be explained in connection with Figure 2.

The video signals are detected in a conventional manner by a television receiver indicated by the numeral 80. They are applied to the control grids 82, 84 and 86 of a three beam cathode ray tube 88. The grids 82, 84 and 86 may form a part of three separate electron guns that are adapted to project a beam of electrons towards a screen 90. The screen 90 and the mask 92 that is mounted between it and the guns may be the same as that described in connection with Figure 1. The sweep voltages derived from the conventional television receiver 80 are applied to a deflection yoke 94 so as to cause all three of the beams to scan the screen 90. In this particular arrangement the electron beam controlled by the grid 82 approaches the apertures 96 in the mask 92 at an angle such that it always strikes the red spots of phosphor mounted on the screen 90. The beam controlled by the grid 84 approaches the apertures 96 from a different angle so that it always strikes the green phosphor; and the beam controlled by the grid 86 approaches from a still different angle so that it strikes the blue phosphor.

A grid 98 controls the convergence of the separate beams so that they cross over at the apertures 96. A grid 99 focuses each beam of electrons at the screen 90. The grid 97 is a screen grid.

A color synchronizer 100 operates to provide a sine wave variation that is synchronized in phase and frequency with the sampling operation performed in the transmitter. This color synchronizer may operate in the fashion similar to that described in connection with Figure 1. The frequency thus provided is the same as the frequency at which any given single color is repeated. The output of the color synchronizer is amplified in an amplifier 102. The plate circuit of this amplifier includes a variable capacitance 104, the adjustment of which effects small changes in phase in the output of the amplifier 102. Any major changes in phase in the output signal from the amplifier 102 are effected by a suitable delay line 106. In this way, the signals appearing at the remote end of the delay line 106 may be made exactly in phase with the sampling wave at the transmitter.

The sampling wave appearing at the output of the delay line 106 is applied to the control grids of three separate keying devices at phases that are 120 degrees apart. These keying devices may take the form of amplifiers 108, 110 and 112. A 120° delay line 114 is connected between a grid 107 of the amplifier 108 and a grid 109 of the amplifier 110. Similarly, a 120° delay line 116 is connected between the grid 109 and a grid 111 of the amplifier 112. The plates of the keying devices 108, 110 and 112 are respectively connected to plate load circuits 118, 120 and 122. The voltage appearing across the load circuit 118 is coupled by a condenser 124 to a cathode 126 of one of the electron guns associated with the cathode ray tube 88. The voltage appearing across the load circuit 120 is coupled via a condenser 128 to a cathode 130 of another of the electron guns in the cathode ray tube 88. The voltage appearing across the load circuit 122 is applied to a cathode 132 of another of the electron guns via a coupling condenser 134. Each of the cathodes 126, 130 and 132 is connected to a separate potentiometer. These potentiometers serve as background controls as they establish the bias between the cathode and grid in each of the electron guns.

Cathodes 136, 138 and 140 of the keying devices 108, 110 and 112 are respectively connected to a source of positive potential via variable resistors 142, 144 and 146. These variable resistors may be separately adjusted so as to control the bias applied to each of the keying devices 108, 110 and 112. The cathodes 136, 138 and 140 are connected to ground via resistors 148, 150 and 152. These cathode resistors are of sufficient size to cause the large amount of degeneration in the signal applied to the grids of the keying devices 108, 110 and 112.

*Operation*

Figure 3:
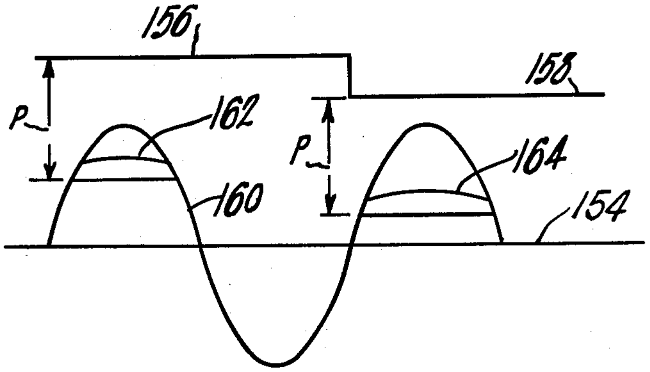
Figure 3 illustrates the operation of the apparatus shown in Figure 2.

The overall operation of this arrangement will be explained in connection with Figure 3. Assume that the sampling wave supplied by the delay line 106 varies about a ground potential indicated by the horizontal line 154. Further assume that the upper line 156 corresponds to the potential of the cathode 136. This potential may be varied to that indicated by the line 158 by suitable adjustment of the variable resistor 142. Assume also that the cut-off potential of the keying device 108 is represented by P volts, as indicated by the bracket. When the sinusoidal wave form supplied by the delay line 106 exceeds this potential, the keying device 108 will begin to conduct. This lowers the plate potential and, therefore, lowers the potential of the cathode 126 in the cathode ray tube 88. Thus, when the keying device 108 is conducting, the cathode 126 is sufficiently negative to permit electrons to flow from it towards the screen 90. Due to the size of the cathode resistor 148 in the keying device, the plate voltage does not follow the sine wave 160. Rather, it follows the line 162. The importance of this fact is that little or no amplitude modulation is coupled into the cathode of the electron gun by the keying wave form 160. Such amplitude modulation would of course produce distortion in the reproduced image.

Assume now that the variable resistor 142 is adjusted so that the cathode potential is not as great as in the case discussed just above. Such a potential is illustrated by the line 158. The cut off potential for the grid will, however, be substantially the same amount below this potential and is again indicated by a bracket P. Therefore, as the sampling wave form 160 rises above ground potential 154, it reaches the cut off potential sooner than in the case previously discussed. Here again, cathode degeneration causes the plate current to follow a line such as that indicated 164. It is seen that the conducting period of the keying device 108 is longer than in the previously described example.

Therefore, it can be seen that the portion of the sampling wave during which a particular keying device conducts can be established by a suitable adjustment of the variable resistors 142, 144 or 146. As the conduction period of the keying devices 108, 110 and 112 controls the time during which a particular beam in the cathode ray tube 88 is turned on, it can be seen that the adjustment of the variable resistors 142, 144 and 146 effectively controls the color balance therein. The reason for this is that the amount of light produced is proportional to the time that it strikes a particular phosphor.

Figure 4:
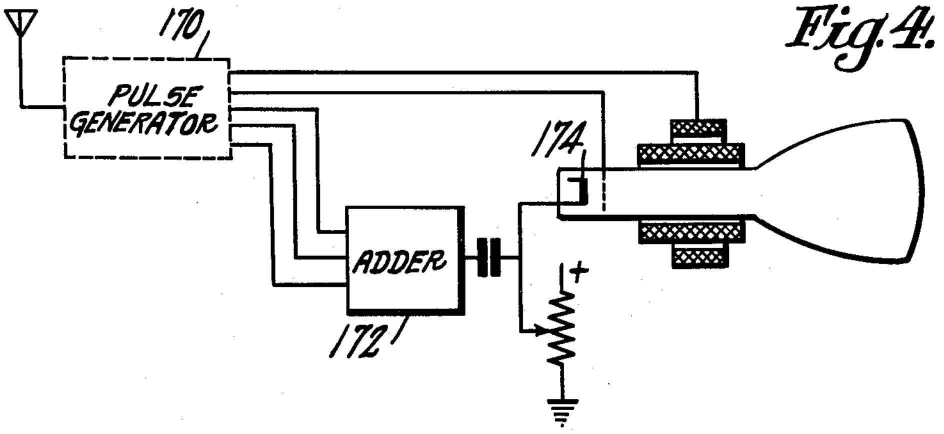
Figure 4 illustrates another arrangement whereby the principles of this invention may be applied to a single beam tube for reproducing colored images.

Color balance can also be achieved in a single beam tube such as shown and described in connection with Figure 1 by employing circuits instead of the diaphragm 42. Such an arrangement is illustrated in Figure 4. The dotted rectangle 170 includes those components included within the dotted rectangle 170' of Figure 2. The differently phased outputs of the keying devices 108, 110 and 112 are applied to an adder 172. The output of the adder 172 is connected to a cathode 174 of a single beam cathode ray tube that is similar to the tube 4 of Figure 1. Thus, the single beam is turned on during successive intervals of time. The relative widths of these intervals are controlled by the biases in the keying devices 108, 110 and 112 as described in connection with Figure 1.

Having described my invention, what is claimed is:

1. An apparatus for producing color balance in a color television receiver that cooperates with transmitted signals representing a plurality of component colors in sequence, comprising in combination a cathode ray tube, a target mounted within said tube, a plurality of phosphors that produce different colors when stimulated by moving electrons, said phosphors being mounted on said target means for detecting said signals, means providing electrons, means for projecting electrons toward the different phosphors in turn and in synchronism with the detected signals, means responsive to said detected signals to modulate said projected electrons, means for interrupting the flow of electrons toward said target in between each separate color signal, said interrupting means adapted to vary the relative duration of the periods during which the electrons impinge upon the different phosphors.

2. An apparatus for controlling color balance in a television receiver that is adapted to cooperate with transmitted signals that in time division multiplex represent the intensities of different component colors in a scanned object, said apparatus comprising in combination means for receiving and detecting said signals, a cathode ray tube having a principal axis, a directional target mounted within said tube, an electron gun for cyclically directing a beam of electrons toward said target at different angles, said target being adapted to produce light of a different component color depending on the direction of approach of the electrons in said beam, coils for focusing said beam and deflection coils adapted to cause said beam to scan said target, means for bending the beam of electrons away from the principal axis of said tube before the electrons are deflected and focused by said coils, said bending means being adapted to rotate the plane in which the beam is bent, a diaphragm of beam obstructing material mounted perpendicularly to the principal axis of the cathode ray tube, apertures within said diaphragm, the orientation of said apertures being such that electrons passing through each one of them impinge on a different color producing phosphor, the radial angle subtended by said apertures being different so as to alter the relative duration of the periods during which the electrons pass through said apertures.

3. An apparatus for controlling color balance in a television receiver that is adapted to cooperate with transmitted signals that represent the intensities of different component colors in a scanned object comprising in combination means for detecting said signals, a plurality of electron guns, a plurality of different phosphors, each phosphor being adapted to emit light of a different component color when struck by moving electrons, each of said phosphors being mounted so as to be struck only by the electrons projected by a particular gun, means for controlling the intensity of said beams in accordance with said detected signals, a keying device associated with each of said electron guns, means for deriving a voltage wave that is synchronized in phase and frequency with said transmitted signals, connections for applying this voltage wave to said keying devices so as to render them operative sequentially, said keying devices being differently biased so that the voltage wave renders the keying devices operative for relatively different periods of time.

4. Apparatus for producing color balance in means for reproducing images in color in response to signals having a first component that sequentially represents the intensity of a plurality of colors and a second component that is indicative of the manner in which the colors are represented by the first component comprising in combination a cathode ray tube, a target mounted within said tube, a plurality of phosphors mounted on said target, different groups of said phosphors being adapted to emit light of a different one of said plurality of colors when struck by a moving electron, means providing electrons, means for projecting said electrons toward said groups of phosphors in sequence, said projecting means being controlled by said second signal component so as to cause said electrons to strike phosphors that emit a color represented by said first component, means responsive to said first signal component for varying the number of said projected electrons, and means for periodically preventing electrons from striking said screen and for controlling the time that the electrons strike the phosphors of the different groups.

5. Apparatus for securing proper color balance in a reproducer adapted to form images in color in response to color signals that represent the primary colors employed at a given sequential rate comprising in combination cathode ray tube apparatus having a target, intermingled groups of phosphor spots mounted on said target, each group being adapted to emit light of a different one of said primary colors when struck by moving electrons, a source of control signals having a frequency corresponding to the frequency with which said color signals represent a given primary color, means for formin pulses in response to said control signals, said pulses having different durations, each of said pulses being phased so as to occur when said color signal represents a different primary color, means providing electrons, means for projecting said electrons toward a phosphor spot that emits light corresponding to the primary color represented by the color signal, means responsive to said color signals for modulating said projected electrons, and means for periodically interrupting said projected electrons and for controlling the time during which the electrons strike a particular phosphor in response to said pulses.

6. In an arrangement for reproducing images in color, apparatus for securing proper color balance comprising in combination a plurality of sources of color signals, each of the signals corresponding to the intensity variations of a different color, a cathode ray tube having a screen, said screen having phosphors that emit light of the different colors represented by the signals, said phosphors being distributed along each line of a raster, means providing electrons, means for sequentially directing said electrons toward each of the phosphors at any given small area in the raster, means responsive to said color signals for varying the number of said electrons directed toward said screen, means for causing the electrons to scan so that the small area struck by them moves along each line of the raster, and means for periodically preventing electrons from striking said screen and for controlling the relative times during which electrons are directed toward the different phosphors within each of said small areas so that electrons are directed toward one set of said phosphors for longer intervals in each sequence than another set of said phosphors.

References Cited in the file of this patent

UNITED STATES PATENTS

| | | |
|---|---|---|
| 2,406,760 | Goldmark | Sept. 3, 1946 |
| 2,473,276 | Chew | June 14, 1949 |
| 2,543,772 | Goldmark | Mar. 5, 1951 |
| 2,587,074 | Sziklai | Feb. 26, 1952 |

FOREIGN PATENTS

| | | |
|---|---|---|
| 23,777/35 | Australia | June 4, 1936 |